United States Patent
Komatsu et al.

(10) Patent No.: US 8,560,177 B2
(45) Date of Patent: Oct. 15, 2013

(54) ELECTRIC POWER STEERING SYSTEM

(75) Inventors: Hayato Komatsu, Aichi (JP);
Yoshinobu Shimizu, Sakai (JP); Yuji Kariatsumari, Yamatotakada (JP);
Shingo Maeda, Okazaki (JP); Yasuyuki Yoshii, Tenri (JP)

(73) Assignee: JTEKT Corporation, Osaka-shi (JP)

( * ) Notice: Subject to any disclaimer, the term of this patent is extended or adjusted under 35 U.S.C. 154(b) by 107 days.

(21) Appl. No.: 13/226,112

(22) Filed: Sep. 6, 2011

(65) Prior Publication Data
US 2012/0055732 A1    Mar. 8, 2012

(30) Foreign Application Priority Data

Sep. 6, 2010   (JP) ................... 2010-199042
Jun. 30, 2011   (JP) ................... 2011-146430

(51) Int. Cl.
*B62D 5/04*  (2006.01)
*B62D 5/00*  (2006.01)

(52) U.S. Cl.
USPC ............................. 701/41; 180/412; 180/443

(58) Field of Classification Search
USPC ............... 701/41–42; 180/443, 412; 340/500
See application file for complete search history.

(56) References Cited

U.S. PATENT DOCUMENTS

| | | | |
|---|---|---|---|
| 6,260,655 B1 | 7/2001 | Mukai et al. | |
| 2007/0233345 A1* | 10/2007 | Endo et al. | 701/41 |
| 2009/0240389 A1* | 9/2009 | Nomura et al. | 701/29 |
| 2009/0256503 A1* | 10/2009 | Ueda et al. | 318/400.02 |
| 2011/0025238 A1* | 2/2011 | Ueda et al. | 318/400.02 |
| 2012/0205186 A1* | 8/2012 | Niimi et al. | 180/446 |

FOREIGN PATENT DOCUMENTS

JP   A-2004-066999   3/2004

OTHER PUBLICATIONS

Mar. 2, 2012 Search Report issued in European Patent Application No. 11180036.3.

* cited by examiner

*Primary Examiner* — Yonel Beaulieu
(74) *Attorney, Agent, or Firm* — Oliff & Berridge, PLC

(57) ABSTRACT

An electric power steering system includes a motor that applies assist force to a steering system, and updates a motor resistance (Rm) that is a value indicating a resistance of the motor. Specifically, the motor resistance (Rm) is updated on the basis of the fact that an induced voltage (EX) of the motor is smaller than a first determination value (GA). In addition, when the induced voltage (EX) is smaller than or equal to a second determination value (GB), a divided value that is obtained by dividing a motor voltage (Vm) by a motor current (Im) is set as a new motor resistance (Rm).

19 Claims, 7 Drawing Sheets

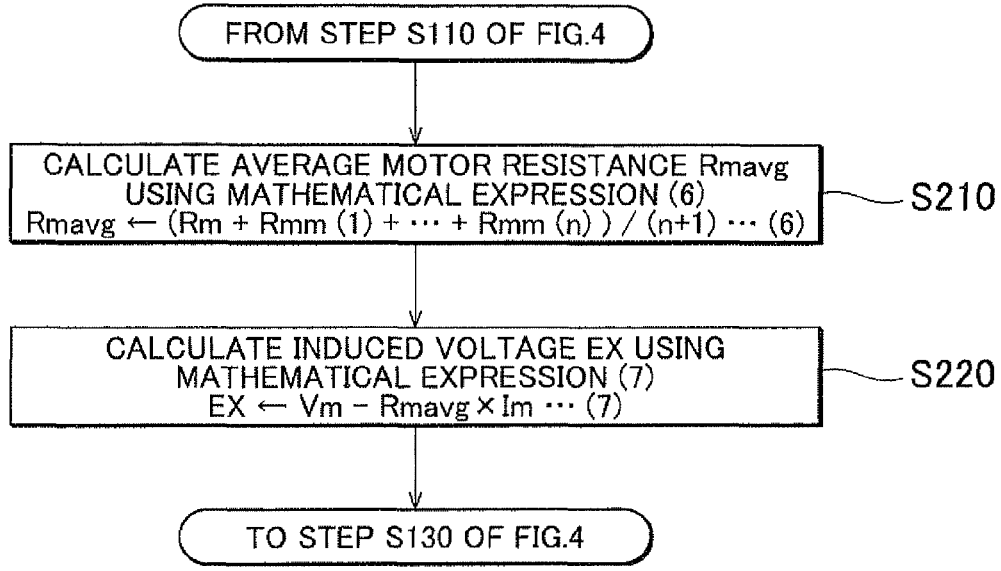
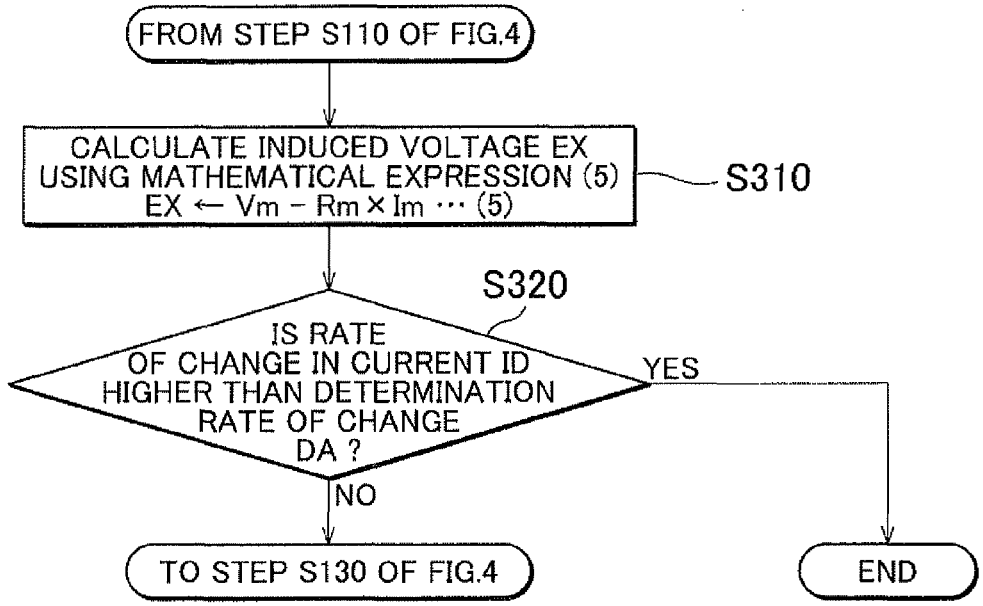

ELECTRIC POWER STEERING SYSTEM

INCORPORATION BY REFERENCE

The disclosure of Japanese Patent Applications No. 2010-199042 filed on Sep. 6, 2010 and No. 2011-146430 filed on Jun. 30, 2011, including the specification, drawings and abstract, is incorporated herein by reference in its entirety.

BACKGROUND OF THE INVENTION

1. Field of the Invention

The invention relates to an electric power steering system that includes a motor that applies assist force to a steering system.

2. Description of Related Art

In an electric power steering system described in Japanese Patent Application Publication No. 2004-66999 (JP-A-2004-66999), a map that defines the correlation between a motor current and a motor resistance is prepared in advance, in view of the fact that an actual resistance of a motor changes depending on a current applied to the motor. A motor resistance is calculated by applying a motor current at that moment to the map. The calculated motor resistance is set as a new motor resistance, and then the set motor resistance is used to execute various computations.

The motor resistance changes under the influence of motor current and outside air temperature. Therefore, it is necessary to take into account induced voltage in order to accurately calculate the motor resistance. That is, induced voltage influences the estimation accuracy of the motor resistance, and the estimation accuracy decreases with an increase in induced voltage. Therefore, it is desirable to calculate the motor resistance with this point taken into account.

However, in existing systems including the electric power steering system described in JP-A-2004-66999, the above point is not particularly taken into account. Therefore, there is a possibility that a newly set motor resistance significantly deviates from an actual motor resistance as the motor resistance is updated.

SUMMARY OF THE INVENTION

It is an object of the invention to provide an electric power steering system that is able to reduce a deviation between a newly set motor resistance and an actual motor resistance.

An aspect of the invention relates to an electric power steering system. The electric power steering system includes a motor that applies assist force to a steering system. A motor resistance that is a value indicating a resistance of the motor is updated. When an induced voltage of the motor is smaller than or equal to a first determination value, the motor resistance is updated.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a flowchart that shows the procedure of "motor resistance updating process" executed by an electronic control unit according to a second embodiment of the invention;

FIG. 8 is a flowchart that shows the procedure of "motor resistance updating process" executed by an electronic control unit according to a third embodiment of the invention.

DETAILED DESCRIPTION OF EMBODIMENTS

Figure 1:
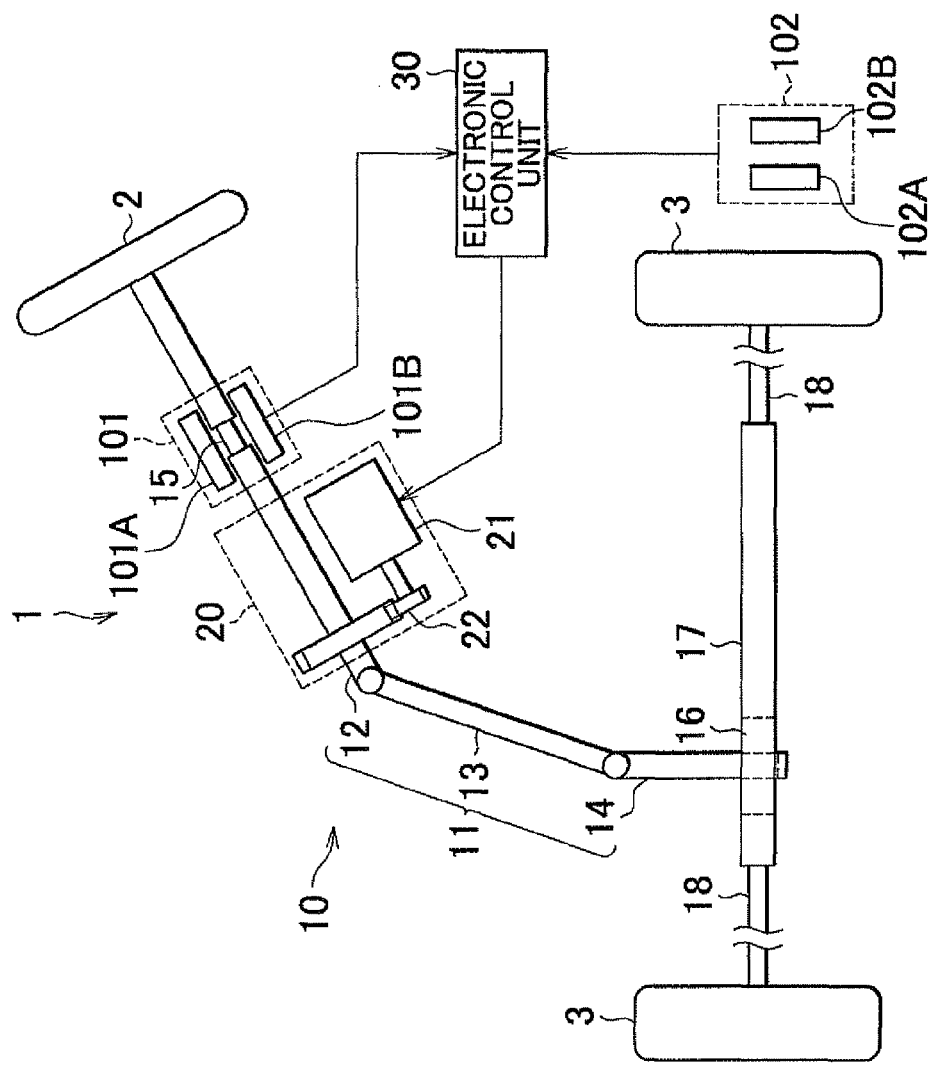
FIG. 1 is a schematic view that schematically shows the overall structure of an electric power steering system according to an embodiment of the invention.

A first embodiment of the invention will be described with reference to FIG. 1 to FIG. 6. FIG. 1 shows the overall configuration of an electric power steering system 1.

The electric power steering system 1 includes a steering angle transmission mechanism 10, an EPS actuator 20, an electronic control unit 30 and a plurality of sensors. The steering angle transmission mechanism 10 transmits the rotation of a steering wheel 2 to steered wheels 3. The EPS actuator 20 applies force for assisting the operation of the steering wheel 2 (hereinafter, "assist force") to the steering angle transmission mechanism 10. The electronic control unit 30 controls the EPS actuator 20. The sensors detect the operating states, and the like, of various devices.

The steering angle transmission mechanism 10 includes a steering shaft 11, a rack and pinion mechanism 16, a rack shaft 17 and tie rods 18. The steering shaft 11 rotates together with the steering wheel 2. The rack and pinion mechanism 16 transmits the rotation of the steering shaft 11 to the rack shaft 17. The rack shaft 17 operates the tie rods 18. The tie rods 18 respectively operate knuckles.

The steering shaft 11 includes a column shaft 12, a pinion shaft 14 and an intermediate shaft 13. The steering wheel 2 is fixed to an end portion of the column shaft 12. The pinion shaft 14 moves the rack shaft 17 in the axial direction via the rack and pinion mechanism 16. The intermediate shaft 13 connects the column shaft 12 to the pinion shaft 14. A torsion bar spring 15 is provided at an intermediate portion of the column shaft 12.

The EPS actuator 20 includes a motor 21 and a reduction mechanism 22. The motor 21 applies torque to the steering shaft 11 (column shaft 12). The reduction mechanism 22 reduces the speed of rotation of the motor 21. A direct-current motor with a brush that includes an inner rotor is provided as the motor 21. The rotation of the motor 21 is reduced in speed by the reduction mechanism 22 and is then transmitted to the steering shaft 11. At this time, torque applied from the motor 21 to the steering shaft 11 acts as assist force.

The steering angle transmission mechanism 10 operates as follows. When the steering wheel 2 is operated, the steering shaft 11 also rotates accordingly. The rotation of the steering shaft 11 is converted to the linear motion of the rack shaft 17 by the rack and pinion mechanism 16. The linear motion of the rack shaft 17 is transmitted to the knuckles via the tie rods 18 that are coupled to respective ends of the rack shaft 17. Then, the steered angle of the steered wheels 3 is changed with the movement of the knuckles.

The steering angle of the steering wheel 2 is determined with reference to a position at which the steering wheel 2 is placed at a neutral position. That is, where the steering angle at which the steering wheel 2 is placed at the neutral position is "0", when the steering wheel 2 rotates clockwise or counterclockwise from the neutral position, the steering angle increases with a rotation angle from the neutral position.

The electric power steering system 1 includes a torque sensor 101 and a vehicle speed sensor 102 as the sensors. These sensors respectively output signals corresponding to changes in states to be monitored as follows.

The torque sensor 101 outputs a signal (hereinafter, referred to as "output signal SA"), corresponding to the magnitude of torque applied to the steering shaft 11 through the operation of the steering wheel 2, to the electronic control unit 30. The vehicle speed sensor 102 outputs signals (hereinafter, "output signals SC"), corresponding to rotation speeds of the steered wheels that are rear wheels of the vehicle, to the electronic control unit 30.

A specific configuration of the torque sensor 101 will be described below. The torque sensor 101 is formed of two sensor elements, that is, a sensor element 101A and a sensor element 101B, and a sensor core (not shown). The sensor element 101A and the sensor element 101B are provided at such positions as to face each other via the torsion bar spring 15. The sensor core (not shown) causes a change in magnetic flux in response to the twist of the torsion bar spring 15. Each of the sensor elements 101A and 101B is arranged around the sensor core, and is formed to include a magnetic sensing element of which the output changes in response to the twist of the torsion bar spring 15.

The output of the torque sensor 101 changes as follows. When torque is input into the column shaft 12 through the operation of the steering wheel 2, a twist occurs in the torsion bar spring 15 in accordance with the magnitude of the torque. As a result, magnetic flux that passes through each of the sensor elements 101A and 101B of the torque sensor 101 changes. Therefore, a voltage output from each of the sensor elements 101A and 101B, that is, the output signal SA of the torque sensor 101, also changes with a change in magnetic flux.

A specific configuration of the vehicle speed sensor 102 will be described below. The vehicle speed sensor 102 is formed of two sensors, that is, a right rear wheel sensor 102A and a left rear wheel sensor 102B, that are respectively provided so as to correspond to the right rear wheel and the left rear wheel. Each of the sensors 102A and 102B outputs one pulse as the output signal SC each time the corresponding rear wheel rotates 360 degrees. That is, the vehicle speed sensor 102 outputs a signal corresponding to the rotation speed of the right rear wheel and a signal corresponding to the rotation speed of the left rear wheel.

The electronic control unit 30 calculates the following values on the basis of the signals output from the sensors. On the basis of the output signal SA of the torque sensor 101, the electronic control unit 30 calculates a value corresponding to the magnitude of torque input into the steering shaft 11 (hereinafter, "steering torque $\tau$") through the operation of the steering wheel 2.

On the basis of the output signals SC of the vehicle speed sensor 102, that is, the output signal SC of the right rear wheel sensor 102A and the output signal SC of the left rear wheel sensor 102B, the electronic control unit 30 calculates a value corresponding to the running speed of the vehicle (hereinafter, "vehicle speed V").

The electronic control unit 30 executes power assist control and steering torque shift control. In the power assist control, assist force is adjusted in response to the running condition of the vehicle and the steering state of the steering wheel 2. In the steering torque shift control, a steering torque $\tau$ used in the power assist control is corrected.

The steering state of the steering wheel 2 is classified into three states, that is, a "rotating state", a "neutral state" and a "retained state". The "rotating state" indicates the state where the steering wheel 2 is rotating. The "neutral state" indicates the state where the steering wheel 2 is placed at a neutral position. The "retained state" indicates the state where the steering wheel 2 is placed at a position that is reached by being rotated clockwise or counterclockwise from the neutral position and is retained at that position. The "rotating state" is classified into two states, that is, a "turning state" and a "returning state". The "turning state" is an operation in such a direction that the steering angle is increased. The "returning state" is an operation in such a direction that the steering angle is reduced.

In the steering torque shift control, the steering torque $\tau$ calculated on the basis of the output signal SA of the torque sensor 101 is corrected on the basis of the steering state of the steering wheel 2, and then the corrected steering torque $\tau$ is output as a "corrected steering torque $\tau a$".

In the power assist control, on the basis of the corrected steering torque $\tau a$ calculated through the steering torque shift control and the vehicle speed V calculated on the basis of the output signals SC of the vehicle speed sensor 102, a target value of assist force (hereinafter, "target assist force") is calculated. Then, a driving electric power corresponding to the target assist force is supplied to the motor 21. Thus, the EPS actuator 20 applies a torque, corresponding to the target assist force, to the steering shaft 11.

Figure 2:
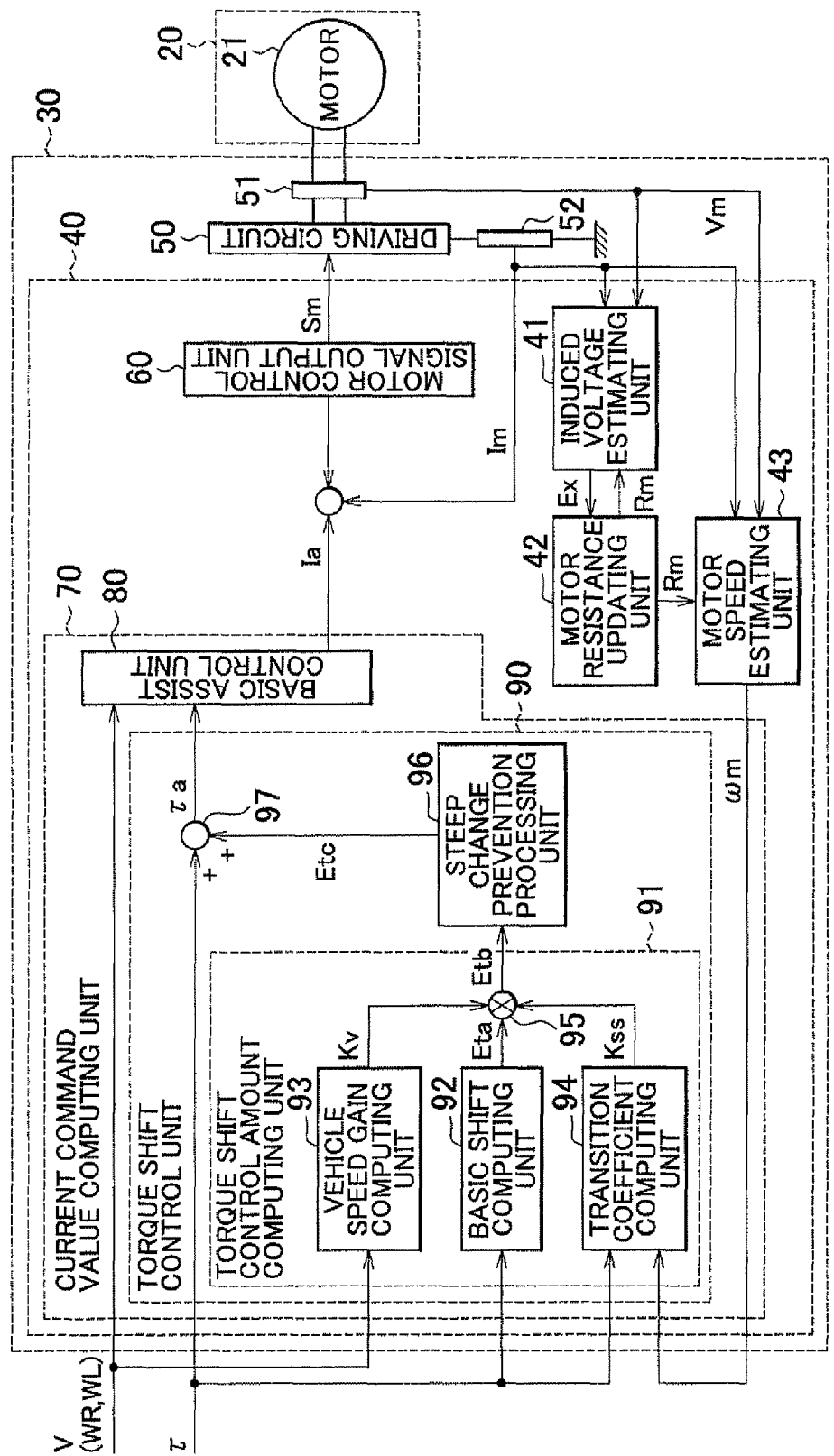
FIG. 2 is a block diagram that shows the configuration of a control system of the electric power steering system according to the embodiment.

The detailed configuration of the electronic control unit 30 will be described with reference to FIG. 2. The electronic control unit 30 includes a microcomputer 40 and a driving circuit 50. The microcomputer 40 outputs a signal for providing instructions on the magnitude of driving electric power supplied to the motor 21 (hereinafter, "motor control signal Sm"). The driving circuit 50 supplies the motor 21 with a driving electric power corresponding to the motor control signal Sm.

The driving circuit 50 includes a voltage sensor 51 and a current sensor 52. The voltage sensor 51 detects a voltage between the terminals of the motor 21 (hereinafter, "motor voltage Vm"). The current sensor 52 detects a current supplied to the motor 21 (hereinafter, "motor current Im"). Note that control blocks provided in the microcomputer 40 are formed of computer programs.

The microcomputer 40 includes a current command value computing unit 70 and a motor control signal output unit 60. The current command value computing unit 70 calculates a current value required to cause the EPS actuator 20 to generate a torque corresponding to the target assist force (hereinafter, "current command value Ia"), that is, a target value of current supplied to the motor 21. The motor control signal output unit 60 generates the motor control signal Sm on the basis of the current command value Ia and the motor current Im.

In addition, the microcomputer 40 includes an induced voltage estimating unit 41, a motor resistance updating unit 42 and a motor speed estimating unit 43. The induced voltage estimating unit 41 determines the steering state of the steering wheel 2 on the basis of the motor voltage Vm and the motor current Im. The motor resistance updating unit 42 calculates a value corresponding to a "motor resistance" that is the resistance of the motor 21 (hereinafter, "motor resistance Rm"), and updates the motor resistance Rm on the basis of a predetermined condition. The motor speed estimating unit 43 calculates a value corresponding to a "motor speed" that is the rotation speed of the motor 21 (hereinafter, "motor speed ωm") on the basis of the motor resistance Rm.

Furthermore, the microcomputer 40 includes a steering torque detecting unit and a storage unit (both are not shown). The storage unit stores, for example, the results obtained through various computations. The steering torque detecting unit calculates the steering torque τ on the basis of the output signal SA of the torque sensor 101. The storage unit stores, for example, the results obtained through various computations.

The current command value computing unit 70 includes a basic assist control unit 80 and a torque shift control unit 90. The basic assist control unit 80 calculates a basic component of target assist force (hereinafter, "basic control amount Ias") on the basis of the vehicle speed V and the steering torque τ. The torque shift control unit 90 corrects the steering torque τ on the basis of the vehicle speed V and the motor speed ωm.

The basic assist control unit 80 calculates the basic control amount Ias as follows.

The basic assist control unit 80 sets the basic control amount Ias to a larger value as the corrected steering torque τa calculated by the torque shift control unit 90 becomes larger. That is, the target assist force is increased as the corrected steering torque τa increases.

The basic assist control unit 80 sets the basic control amount Ias to a larger value as the vehicle speed V decreases. That is, the target assist force is increased as the vehicle speed V decreases.

The motor control signal output unit 60 executes feedback control over the current command value Ia on the basis of the current command value Ia and the motor current Im, and generates the motor control signal Sm on the basis of the resultant current command value Ia. The generated motor control signal Sm is output to the driving circuit 50.

The motor speed estimating unit 43 calculates the motor speed ωm according to the following mathematical expression 1) that is used as a motor equation.

$$\omega m = (Vm - Im \times Rm)/Ke \quad\quad 1)$$

"Vm" denotes the motor voltage Vm input from the voltage sensor 51. "Im" denotes the motor current Im input from the current sensor 52. "Rm" denotes the motor resistance Rm prestored in the storage unit. A value corresponding to a resistance specific to the motor 21 is used as the motor resistance Rm.

"Ke" denotes a counter electromotive force constant Ke of the motor 21, prestored in the storage unit. A value corresponding to a counter electromotive force constant Ke specific to the motor 21 is used as the counter electromotive force constant Ke. The motor resistance updating unit 42 calculates the motor resistance Rm on the basis of the steering state of the steering wheel 2 and according to the following mathematical expression 2) that is used as a motor voltage equation.

$$EX = Vm - Rm \times Im - L \times (dIm/ds) \quad\quad 2)$$

"Vm" denotes the motor voltage Vm input from the voltage sensor 51. "Im" denotes the motor current Im input from the current sensor 52. "L" denotes the inductance of the motor 21. "dIm/ds" denotes the time rate of change in the motor current Im (hereinafter, "rate of change in current ID").

"EX" denotes the induced voltage EX of the motor 21. When the induced voltage EX is small, "dIm/ds" and "EX" may be regarded as "0". Therefore, the mathematical expression 2) may be modified into the following mathematical expression 3).

$$Rm = Vm/Im \quad\quad 3)$$

When the induced voltage EX is small, the motor resistance updating unit 42 calculates a new motor resistance Rm on the basis of the motor voltage Vm and the motor current Im. In addition, a new motor resistance Rm is calculated on the basis of the motor voltage Vm, the motor current Im and the motor resistance Rm stored at the time of updating. The thus calculated motor resistance Rm is stored in the storage unit as a new motor resistance Rm that replaces the motor resistance Rm currently stored in the storage unit.

The induced voltage estimating unit 41 calculates an induced voltage EX on the basis of the motor resistance Rm, the motor voltage Vm, and the motor current Im and according to the above mathematical expression 2). The calculated induced voltage EX is output to the motor resistance updating unit 42.

The torque shift control unit 90 includes a torque shift control amount computing unit 91, a steep change prevention processing unit 96 and an adder 97. The torque shift control amount computing unit 91 computes a compensation component of steering torque shift control (hereinafter, "torque shift control amount Etb"). The steep change prevention processing unit 96 executes filtering for suppressing a steep change in the torque shift control amount Etb. The adder 97 superimposes the torque shift control amount Etc on the steering torque τ to calculate the corrected steering torque τa.

The torque shift control amount computing unit 91 includes a basic shift computing unit 92, a vehicle speed gain computing unit 93, a transition coefficient computing unit 94 and a multiplier 95. The basic shift computing unit 92 calculates a basic shift control amount Eta that becomes a basic compensation component of steering torque shift control. The vehicle speed gain computing unit 93 calculates a gain of the basic shift control amount Eta (hereinafter, "vehicle speed gain Kv") on the basis of the vehicle speed V. The transition coefficient computing unit 94 calculates a transition coefficient Kss that indicates the steering state of the steering wheel 2. The multiplier 95 multiplies the basic shift control amount Eta by the vehicle speed gain Kv and by the transition coefficient Kss to calculate the torque shift control amount Etb.

The basic shift computing unit 92 calculates the basic shift control amount Eta as follows.

The basic shift computing unit 92 sets the basic shift control amount Eta to a larger value as the steering torque τ increases. That is, as the steering torque τ increases, the target assist force is increased.

When the steering torque τ is larger than or equal to a predetermined value, the basic shift computing unit 92 keeps the basic shift control amount Eta at a constant value with respect to the steering torque τ.

The vehicle speed gain computing unit 93 calculates the vehicle speed gain Kv as follows.

The vehicle speed gain computing unit 93 sets the vehicle speed gain Kv to a larger value as the vehicle speed V increases.

When the vehicle speed V is higher than or equal to a predetermined value, the vehicle speed gain computing unit 93 keeps the vehicle speed gain Kv at a constant value with respect to the vehicle speed V.

The transition coefficient computing unit 94 calculates a transition coefficient Kss corresponding to the steering state of the steering wheel 2, that is, the "turning state", the "returning state" or the "retained state", on the basis of the direction of the steering torque τ and the motor speed ωm.

The steep change prevention processing unit 96 filters the torque shift control amount Etb output from the torque shift control amount computing unit 91 using a low-pass filter, and outputs the filtered torque shift control amount Etb to the adder 97 as the torque shift control amount Etc. The low-pass filter is configured as a filter for suppressing a steep change in the torque shift control amount Etb.

The details of a method of calculating the transition coefficient Kss will be described with reference to FIG. 3A and FIG. 3B. The transition coefficient computing unit 94 calculates the transition coefficient Kss using two maps that correlate the direction of the steering torque τ and the motor speed ωm with the transition coefficient Kss. That is, the map (FIG. 3A) in the case where the sign of the steering torque τ is positive and the map (FIG. 3B) in the case where the sign of the steering torque τ is negative are used to calculate the transition coefficient Kss.

Figure 3A:
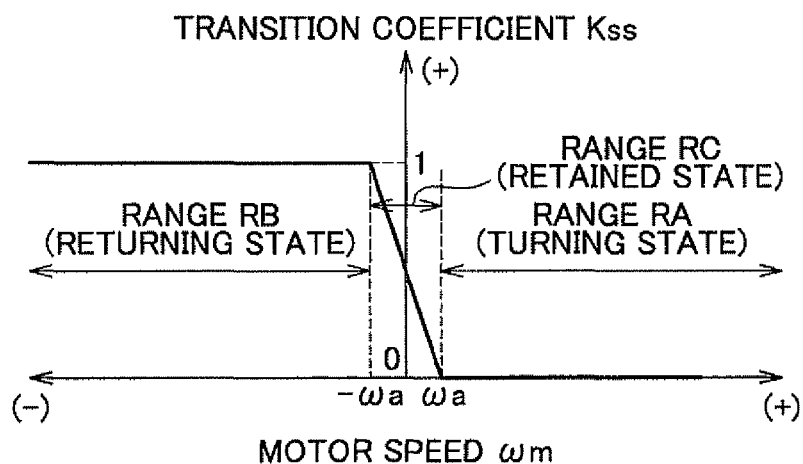
FIG. 3A and FIG. 3B are maps that define the correlations between a motor speed and a transition coefficient, used in steering torque shift control according to the embodiment.

As shown in FIG. 3A, in the map in the case where the sign of the steering torque τ is positive, the range of the motor speed ωm is divided into three ranges by a determination value ωa and a determination value −ωa. That is, the range of the motor speed ωm is divided into a range RA in which the motor speed ωm is higher than or equal to the determination value ωa, a range RB in which the motor speed ωm is lower than or equal to the determination value −ωa, and a range RC in which the motor speed ωm is lower than the determination value ωa and higher than the determination value −ωa.

The range RA is set as a range in which the steering state of the steering wheel 2 is the "turning state". The range RB is set as a range in which the steering state of the steering wheel 2 is the "returning state". The range RC is set as a range in which the steering state of the steering wheel 2 is the "retained state".

In the range RA, the transition coefficient Kss is set to "0". In the range RB, the transition coefficient Kss is set to "1". In the range RC, the transition coefficient Kss is set so as to increase from "0" toward "1" as the motor speed ωm reduces from the determination value ωa toward the determination value −ωa.

Figure 3B:
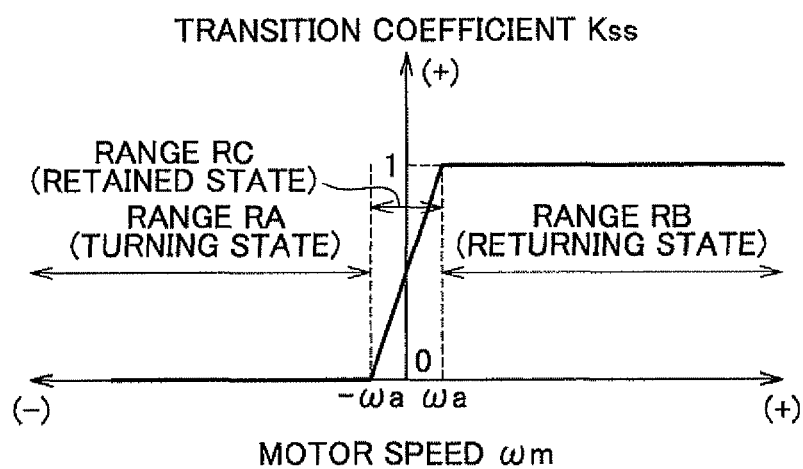

As shown in FIG. 3B, in the map in the case where the sign of the steering torque τ is negative, the range of the motor speed ωm is divided into three ranges by the determination value ωa and the determination value −ωa. That is, the range of the motor speed ωm is divided into a range RA in which the motor speed ωm is lower than or equal to the determination value −ωa, a range RB in which the motor speed ωm is higher than or equal to the determination value ωa and a range RC in which the motor speed ωm is lower than the determination value ωa and higher than the determination value −ωa.

The range RA is set as a range in which the steering state of the steering wheel 2 is the "turning state". The range RB is set as a range in which the steering state of the steering wheel 2 is the "returning state". The range RC is set as a range in which the steering state of the steering wheel 2 is the "retained state".

In the range RA, the transition coefficient Kss is set to "0". In the range RB, the transition coefficient Kss is set to "1". In the range RC, the transition coefficient Kss is set so as to increase from "0" toward "1" as the motor speed ωm increases from the determination value −ωa toward the determination value ωa.

As described above, the transition coefficient computing unit 94 determines the steering state of the steering wheel 2 on the basis of the direction of the steering torque τ (the sign of the steering torque τ) and the rotation direction of the steering wheel 2 (the sign of the motor speed ωm). That is, when the sign of the steering torque τ coincides with the sign of the motor speed ωm, it is determined that the steering state is the "turning state". When the sign of the steering torque τ does not coincide with the sign of the motor speed ωm, it is determined that the steering state is the "returning state". When the motor speed ωm is "0" or close to "0" in the case where the steering state is other than the "neutral state", it is determined that the steering state is the "retained state".

In the steering torque shift control, when the steering state of the steering wheel 2 is the "retained state" or the "returning state", the torque shift control amount Etc is calculated such that the basic control amount Ias increases due to the corrected steering torque τa. Thus, a driver's force required to maintain the "retained state" is reduced, and a feeling of strangeness experienced by the driver at the time of shifting from the "retained state" to the "returning state" is suppressed. In addition, when the steering state is the "turning state", "0" is calculated as the torque shift control amount Etc, that is, the steering torque τ is not corrected by the torque shift control amount Etc. Therefore, occurrence of a phenomenon that the driver experiences a feeling of strangeness due to application of excessively large assist force, that is, a phenomenon that the driver feels that the "steering wheel is light" is suppressed.

As described above, the motor speed ωm used in the steering torque shift control is calculated on the basis of the motor voltage Vm, the motor current Im and the motor resistance Rm. Therefore, in order to accurately execute steering torque shift control, it is required to calculate the motor speed ωm closer to an actual value.

However, the motor resistance Rm changes under the influence of the temperature of the motor 21, the motor current Im, and the like. Therefore, when the motor speed ωm is calculated on the basis of the motor resistance Rm that does not reflect such influence, the motor speed ωm may significantly deviate from an actual motor speed.

Then, the electronic control unit 30 updates the motor resistance Rm on the basis of the motor voltage Vm and the motor current Im, and executes "motor resistance updating process" as process for reducing a deviation between the motor resistance Rm, used in various computations, and an actual motor resistance.

The procedure of the "motor resistance updating process" will be described with reference to FIG. 4. Note that the process is prestored in the storage unit and is repeatedly executed by the microcomputer 40 in each predetermined computation cycle.

In step S110, the motor current Im and the motor voltage Vm are acquired. In step S120, the induced voltage EX is calculated according to the above mathematical expression 2). In step S130, it is determined whether the induced voltage EX is larger than a first determination value GA. In addition, in the next step S140, it is determined whether the induced voltage EX is larger than a second determination value GB. Then, a mode in which the motor resistance Rm is updated is selected like the following A) to C) on the basis of the result of at least one of the determining processes of steps S130 and S140.

A) When it is determined in step S130 that the induced voltage EX is larger than the first determination value GA, it is estimated that the steering state of the steering wheel 2 is the "rotating state". That is, it is estimated that the timing is not appropriate to update the motor resistance Rm. Therefore, the process is once ended without updating the motor resistance Rm.

B) When it is determined in step S130 that the induced voltage EX is smaller than or equal to the first determination value GA and it is determined in step S140 that the induced voltage EX is smaller than or equal to the second determination value GB, a value that is obtained by dividing the motor voltage Vm by the motor current Im (hereinafter, "divided value DX") is calculated and then the divided value DX is stored as a new motor resistance Rm in step S150.

When the induced voltage EX is smaller than or equal to the second determination value GB, the induced voltage EX may be presumed as "0" because the induced voltage EX is sufficiently small. Thus, the motor resistance Rm is calculated according to the above mathematical expression 3). In addition, at this time, the steering state of the steering wheel 2 may be estimated to be the "neutral state" or the "retained state".

C) When it is determined in step S130 that the induced voltage EX is smaller than or equal to the first determination value GA and it is determined in step S140 that the induced voltage EX is larger than the second determination value GB, the motor resistance Rm is calculated according to the following mathematical expression 4) in step S160.

$$Rm \leftarrow \gamma x \times Rmold + \gamma y \times (Vm/Im) \qquad 4)$$

"Vm" denotes the motor voltage Vm input from the voltage sensor 51. "Im" denotes the motor current Im input from the current sensor 52. "Rmold" denotes the motor resistance Rm currently stored in the storage unit (hereinafter, "pre-updated motor resistance Rmold").

"$\gamma x$" denotes a weighting coefficient for the pre-updated motor resistance Rmold. "$\gamma y$" denotes a weighting coefficient for (Vm/Im). That is, in step S160, a new motor resistance Rm is calculated using the weighted average of the "pre-updated motor resistance Rmold" and "Vm/Im" according to the above mathematical expression 4).

Figure 5:
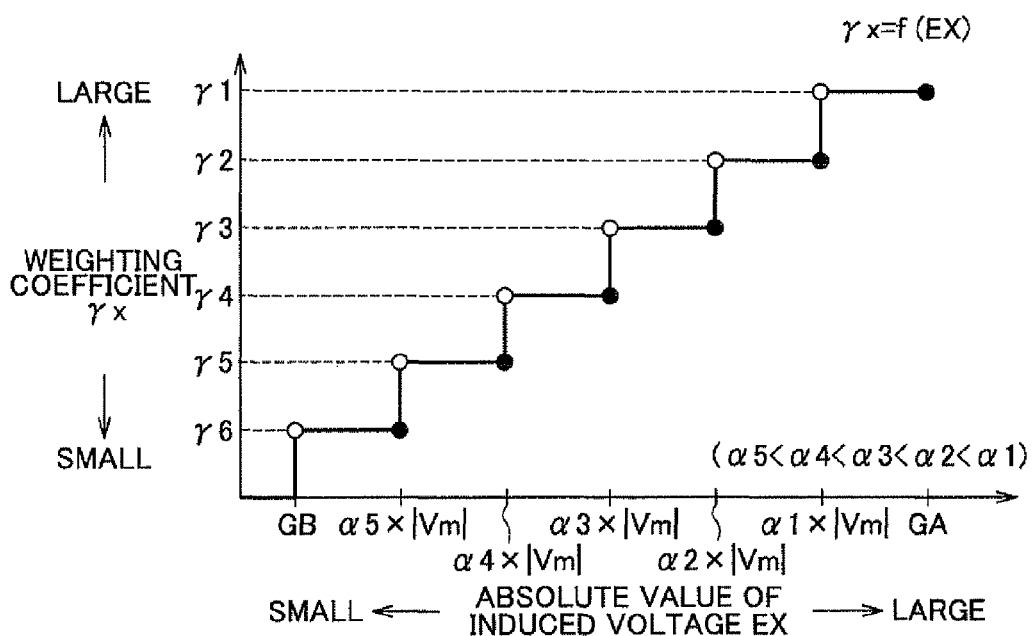
FIG. 5 is a map for calculating a weighting coefficient $\gamma x$ in the "motor resistance updating process" executed by the electronic control unit according to the embodiment.

The weighting coefficient $\gamma x$ is calculated by applying the induced voltage EX to the map shown in FIG. 5. The weighting coefficient $\gamma y$ is calculated by the formula of $(1-\gamma x)$. That is, the sum of the weighting coefficient $\gamma x$ and the weighting coefficient $\gamma y$ is "1".

In the map of FIG. 5, the range of the induced voltage EX is divided into a plurality of ranges by values (hereinafter, boundary values) that are obtained by multiplying coefficients $\alpha$ by the absolute value of the motor voltage Vm. In each range between the consecutive boundary values, the same weighting coefficient $\gamma x$ is set for the induced voltage EX. The coefficients $\alpha$ for the motor voltage Vm are set such that "$\alpha 1 > \alpha 2 > \alpha 3 > \alpha 4 > \alpha 5$". The weighting coefficients $\gamma x$ are set such that "$1 > \gamma 1 > \gamma 2 > \gamma 3 > \gamma 4 > \gamma 5$".

Thus, as the induced voltage EX approaches the first determination value GA, the motor resistance Rm is calculated so as to approach the pre-updated motor resistance Rmold. On the other hand, as the induced voltage EX approaches the second determination value GB, the motor resistance Rm is calculated so as to approach "Vm/Im".

As the induced voltage EX increases, the influence of the induced voltage EX on the estimation accuracy of the motor resistance Rm increases. Therefore, in order to suppress a decrease in estimation accuracy, it is desirable to increase the degree of reflection of the pre-updated motor resistance Rmold in a newly calculated motor resistance Rm. Therefore, in the map of FIG. 5, the correlation between the induced voltage EX and the weighting coefficient $\gamma x$ is defined such that, as the induced voltage EX increases, the weighting coefficient $\gamma x$ is calculated so as to be larger.

Figure 6:
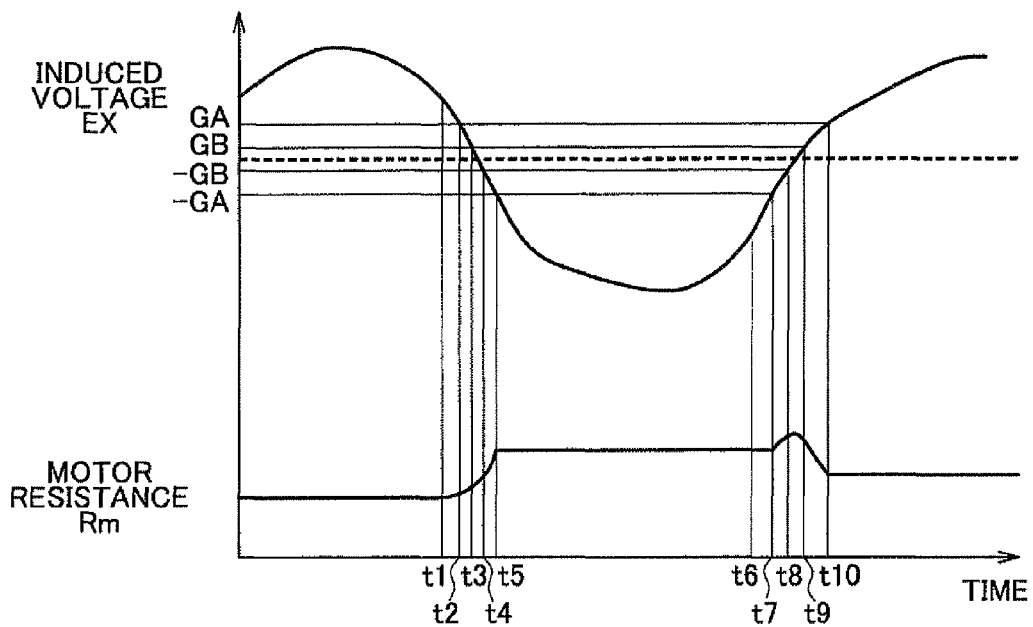
FIG. 6 is a timing chart that shows a change in motor resistance in the "motor resistance updating process" executed by the electronic control unit according to the embodiment.

An example of a mode in which the "motor resistance updating process" is executed will be described with reference to FIG. 6. Note that, in a period from time t1 to time t5, the position of the steering wheel 2 is retained in process of rotating the steering wheel 2 in one direction and then the steering wheel 2 is rotated again in the same direction. In a period from time t6 to time t10, the position of the steering wheel 2 is retained in process of rotating the steering wheel 2 in the opposite direction to the rotation direction in the period from time t1 to time t5 and then the steering wheel 2 is rotated again in the same direction.

At time t1, that is, when the absolute value of the induced voltage EX is larger than the first determination value GA, process of updating the motor resistance Rm is not executed. At this time, the steering state of the steering wheel 2 is estimated to be the "rotating state", that is, the timing is not appropriate to update the motor resistance Rm. Therefore, the motor resistance Rm is not updated.

At time t2, that is, when the absolute value of the induced voltage EX is smaller than or equal to the first determination value GA and is larger than the second determination value GB, the motor resistance Rm is calculated using the weighted average of the divided value DX and the pre-updated motor resistance Rmold. The motor resistance Rm calculated at this time is stored in the storage unit as a new motor resistance Rm.

At time t3, that is, when the absolute value of the induced voltage EX is smaller than or equal to the second determination value GB, the divided value DX is calculated and then the divided value DX is stored as a new motor resistance Rm. At this time, the steering state of the steering wheel 2 is estimated to be the "neutral state" or the "retained state". In addition, the induced voltage EX is regarded as "0". Therefore, the motor resistance Rm is accurately calculated on the basis of the mathematical expression 3).

At time t4, that is, when the absolute value of the induced voltage EX is larger than the second determination value GB, the motor resistance Rm is obtained on the basis of the weighted average of the divided value DX and the pre-updated motor resistance Rm. Then, the value obtained at this time is stored as a new motor resistance Rm.

At time t5, that is, when the absolute value of the induced voltage EX is larger than the first determination value GA, process of updating the motor resistance Rm is not executed. Similarly, in a period from time t5 to time t6 as well, the absolute value of the induced voltage EX is larger than the first determination value GA. Therefore, process of updating the motor resistance Rm is not executed.

At time t7, that is, when the absolute value of the induced voltage EX is smaller than or equal to the first determination value GA and is larger than the second determination value GB, the motor resistance Rm is calculated using the weighted average of the divided value DX and the pre-updated motor resistance Rmold. The motor resistance Rm calculated at this time is stored in the storage unit as a new motor resistance Rm.

At time t8, that is, when the absolute value of the induced voltage EX is smaller than or equal to the second determination value GB, the divided value DX is calculated and then the divided value DX is stored as a new motor resistance Rm. In addition, the induced voltage EX is regarded as "0". Therefore, the motor resistance Rm may be accurately calculated according to the mathematical expression 3).

At time t9, that is, when the absolute value of the induced voltage EX is larger than the second determination value GB, the motor resistance Rm is obtained on the basis of the weighted average of the divided value DX and the pre-updated motor resistance Rm. Then, the value obtained at this time is stored as a new motor resistance Rm.

At time t10, that is, when the absolute value of the induced voltage EX is larger than the first determination value GA, process of updating the motor resistance Rm is not executed. In addition, similarly, at time t10 and a period after time t10 as well, the absolute value of the induced voltage EX is larger than the first determination value GA. Therefore, process of updating the motor resistance Rm is not executed.

With the electric power steering system 1 according to the present embodiment, the following advantageous effects may be obtained.

1) In the present embodiment, the motor resistance Rm is updated on the condition that the induced voltage EX of the motor 21 is smaller than or equal to the first determination value GA.

In this configuration, when the induced voltage EX of the motor 21 is smaller than or equal to the first determination value GA, that is, when the influence of the induced voltage EX on the estimation accuracy of the resistance of the motor 21 is small, the motor resistance Rm is updated. Therefore, it is possible to reduce a deviation between a newly set motor resistance Rm and an actual resistance of the motor 21.

2) In the present embodiment, when the induced voltage EX is smaller than or equal to the second determination value GB, the divided value DX that is obtained by dividing the motor voltage Vm by the motor current Im is set as a new motor resistance Rm.

When there is not the influence of the induced voltage EX on the estimation accuracy of the resistance of the motor 21, it is desirable that a value that appropriately reflects an actual resistance of the motor 21, that is, the resistance of the motor 21 (divided value DX) calculated on the basis of the motor voltage Vm and the motor current Im, be set as a new motor resistance Rm. However, actually, the induced voltage EX influences the estimation accuracy of the resistance of the motor 21 as described above, the accuracy of the divided value DX decreases with an increase in the induced voltage EX, and the divided value DX deviates from an actual resistance of the motor 21. In the above configuration, in view of this point, when the induced voltage EX of the motor 21 is smaller than or equal to the second determination value GB, that is, when the accuracy of the divided value DX is estimated to be relatively high, the divided value DX is set as a new motor resistance Rm. Therefore, it is possible to reduce a deviation between a newly set motor resistance Rm and an actual resistance of the motor 21.

3) In the present embodiment, when the induced voltage EX is larger than the second determination value GB and is smaller than or equal to the first determination value GA, the motor resistance Rm is calculated on the basis of the pre-updated motor resistance Rmold (the motor resistance calculated in the immediately preceding motor resistance updating process) currently set and the divided value DX that is obtained by dividing the motor voltage Vm by the motor current Im, and is set as a new motor resistance Rm.

In the case where the accuracy of the divided value DX is estimated to be low due to the influence of the induced voltage EX of the motor 21, when the divided value DX is directly set as a new motor resistance Rm, there is a possibility that a large deviation occurs between a newly set motor resistance Rm and an actual resistance of the motor 21.

Therefore, although the influence of the induced voltage EX on the estimation accuracy of the resistance of the motor 21 is smaller when the induced voltage EX is smaller than or equal to the first determination value GA and is larger than the second determination value GB than when the induced voltage EX is larger than the first determination value GA, it is not desirable that the divided value DX be set as a new motor resistance Rm.

In the above configuration, in view of this point, a new motor resistance Rm is calculated on the basis of the pre-updated motor resistance Rmold (the motor resistance calculated in the immediately preceding motor resistance updating process) and the divided value DX. Therefore, it is possible to reduce a deviation between a newly set motor resistance Rm and an actual resistance of the motor 21 in comparison with the configuration where the divided value DX is directly set as a new motor resistance Rm.

4) In the present embodiment, when the induced voltage EX is larger than the second determination value GB and is smaller than or equal to the first determination value GA, a new motor resistance Rm is calculated using the weighted average of the pre-updated motor resistance Rmold (the motor resistance calculated in the immediately preceding motor resistance updating process) and the divided value DX.

As the induced voltage EX of the motor 21 approaches the second determination value GB, that is, as the induced voltage EX of the motor 21 reduces, the influence of the induced voltage EX on the estimation accuracy of the divided value DX decreases.

In the above configuration, in view of this point, as the induced voltage EX approaches the second determination value GB, the weight of the divided value DX is increased with respect to the weight of the pre-updated motor resistance Rmold (the motor resistance calculated in the immediately preceding motor resistance updating process). Therefore, it is possible to reduce a deviation between a newly set motor resistance Rm and an actual resistance of the motor 21.

A second embodiment of the invention will be described above. The electric power steering system 1 according to the present embodiment differs from the electric power steering system 1 according to the first embodiment in that the details of the "motor resistance updating process" are changed as described below. Note that the other components are similar to those of the electric power steering system 1 according to the first embodiment. Therefore, hereinafter, the difference from the first embodiment will be described in detail, like reference numerals denote the same components to those of the first embodiment, and the description thereof is partially or entirely omitted.

The inductance L of the motor 21 is sufficiently small. Therefore, the influence of the inductance L on the induced voltage EX is small. Thus, when "L" is regarded as "0", the above mathematical expression 2) may be modified into the following mathematical expression 5).

$$EX = Vm - Rm \times Im \qquad 5)$$

When only the motor resistance Rm updated in the immediately preceding computation cycle is used at the time of calculating the induced voltage EX, there is a possibility that the induced voltage EX and the motor resistance Rm diverge. Then, the electronic control unit 30 sequentially stores the pre-updated motor resistance Rm in the storage unit as a stored value (hereinafter, "stored motor resistance Rmm") when the motor resistance Rm is updated, and calculates the induced voltage EX according to the following mathematical expression 7) that is formulated by replacing the motor resistance Rm of the mathematical expression 5) with the average value of the motor resistance Rm and the stored motor resistances Rmm (hereinafter, "average motor resistance Rmavg") in multiple computation cycles.

$$Rmavg = (Rm + Rmm(1) + \ldots + Rmm(n))/(n+1) \qquad 6)$$

"Rmm" denotes the stored motor resistance Rmm. "Rmavg" denotes the average value of "Rm" and "Rmm" updated in the computation cycle immediately preceding to the computation cycle of Rm ("Rmm(1)") to "Rmm" updated in the computation cycle n cycles before the computation cycle of Rm ("Rmm(n)").

The procedure of the "motor resistance updating process" will be described with reference to FIG. 7. In this process, after step S110 of FIG. 4, the following processes are executed. In step S210, the average motor resistance Rmavg is calculated according to the above mathematical expression 6).

In step S220, the induced voltage EX is calculated according to the mathematical expression 7) that is formulated by replacing the motor resistance Rm in the mathematical expression 5) with the average motor resistance Rmavg.

$$EX \leftarrow Vm - Rmavg \times Im \qquad 7)$$

Figure 4:
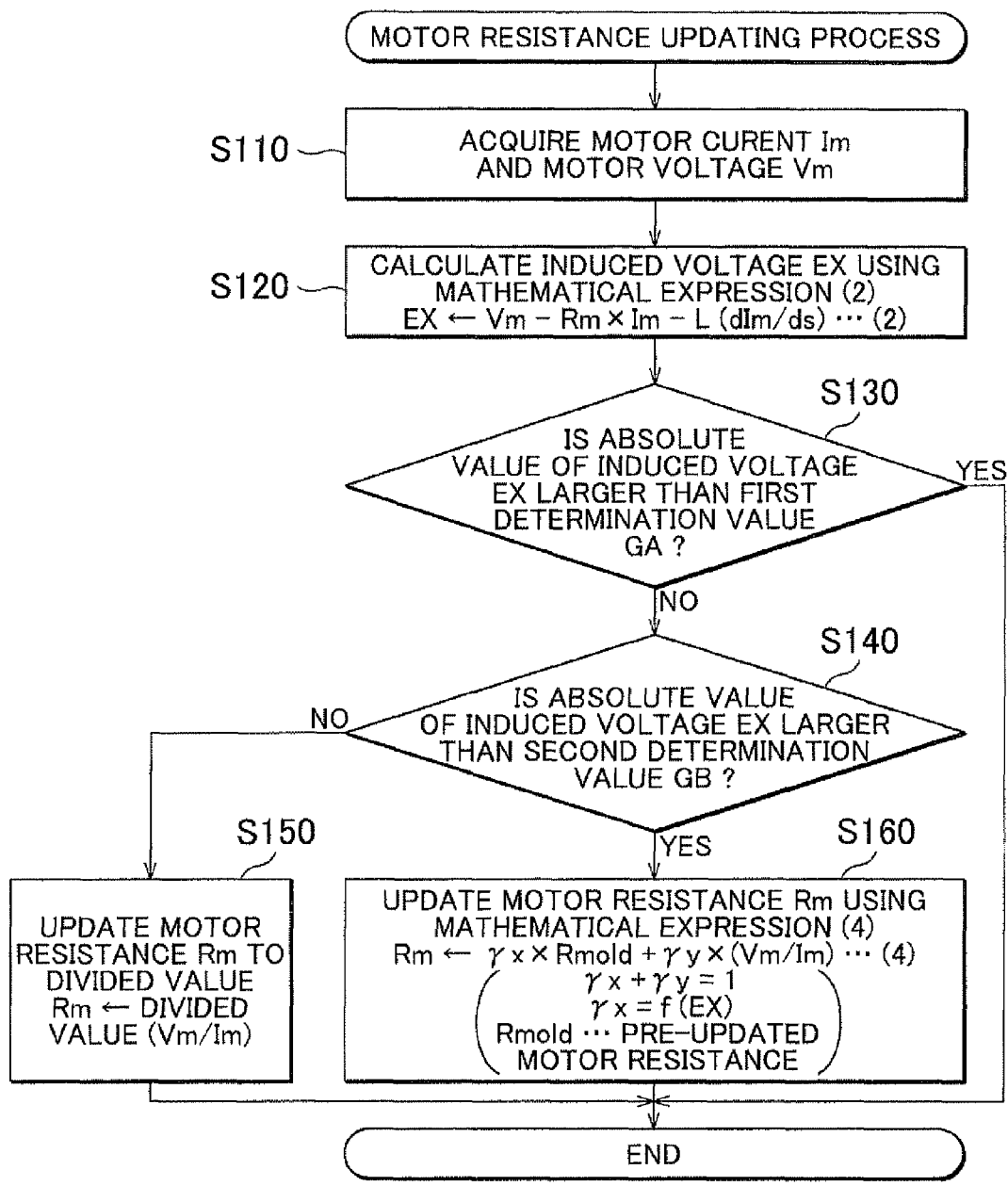
FIG. 4 is a flowchart that shows the procedure of "motor resistance updating process" executed by an electronic control unit according to the embodiment.

Then, the induced voltage EX calculated in step S220 is used to execute the processes in step S130 and the following steps in FIG. 4.

With the electric power steering system 1 according to the present embodiment, in addition to the advantageous effects 1) to 4) of the first embodiment, the following advantageous effects are obtained.

5) In the present embodiment, the induced voltage EX is calculated according to the motor voltage equation. Thus, the induced voltage EX may be calculated based on only the motor voltage Vm, the motor resistance Rm and the motor current Im.

In addition, the induced voltage EX is calculated according to the mathematical expression 5) in which the inductance L is regarded as "0". Therefore, the number of terms and the number of constants are less than those in the case where the induced voltage EX is calculated according to the mathematical expression 2). Thus, a computation load is reduced.

6) In the present embodiment, the induced voltage EX is calculated according to the mathematical expression 7) that is formulated by replacing the motor resistance Rm with the average motor resistance Rmavg calculated on the basis of the stored motor resistances Rmm. Therefore, in comparison with the case where only the motor resistance Rm is used to calculate the induced voltage EX, it is less likely that the induced voltage EX diverges. Thus, it is possible to suppress deterioration in the estimation accuracy of the induced voltage EX.

A third embodiment of the invention will be described below. The electric power steering system 1 according to the present embodiment differs from the electric power steering system 1 according to the first embodiment in that the details of the "motor resistance updating process" are changed as described below. Note that the other components are similar to those of the electric power steering system 1 according to the first embodiment. Therefore, hereinafter, the difference from the first embodiment will be described in detail, like reference numerals denote the same components to those of the first embodiment, and the description thereof is partially or entirely omitted.

When "dIm/ds" is small, the term "L×(dIm/ds)" further approaches "0". That is, in the above mathematical expression 5), when "dIm/ds" is sufficiently small, the influence of the term "L×(dIm/ds)" on the induced voltage EX further decreases. Therefore, in the present embodiment, the induced voltage EX is calculated when "dIm/ds" is sufficiently small.

The procedure of the "motor resistance updating process" will be described with reference to FIG. 8. In this process, after step S110 of FIG. 4, the following processes are executed. In step S310, it is determined whether the rate of change in current ID is higher than a determination rate of change DA. When it is determined in step S310 that the rate of change in current ID is higher than the determination rate of change DA, the process is once ended without updating the motor resistance Rm. Then, when it is determined in step S310 that the rate of change in current ID is lower than or equal to the determination rate of change DA, the process proceeds to step S320.

In step S320, the induced voltage EX is calculated on the basis of the above mathematical expression 5). Then, the induced voltage EX calculated in step S320 is used to execute the processes in step S130 and the following steps in FIG. 4.

With the electric power steering system 1 according to the present embodiment, in addition to the advantageous effects 1) to 4) of the first embodiment and the advantageous effect 5) of the second embodiment, the following advantageous effects may be obtained.

7) In the present embodiment, when the rate of change in current ID is lower than or equal to the determination rate of change DA, the induced voltage EX is calculated according to the motor voltage equation. That is, the induced voltage EX is calculated when the influence of the term "L×(dIm/ds)" on the induced voltage EX is relatively small. Therefore, it is possible to suppress an increase in the deviation between the calculated induced voltage EX and an actual induced voltage of the motor.

8) In the present embodiment, when the rate of change in current ID is higher than the determination rate of change DA, calculation of the induced voltage EX and calculation of the motor resistance Rm are suspended. Therefore, when the rate of change in current ID is higher than the determination rate of change DA, it is possible to reduce the amount of computation to calculate the induced voltage EX and to calculate the motor resistance Rm.

The invention is not limited to the embodiments described above, and the invention may be, for example, implemented in the following alternative embodiments. In addition, the following alternative embodiments are not only applied to the above embodiments; a combination of the different alternative embodiments may also be implemented.

In step S120 of the "motor resistance updating process" according to the first embodiment, the induced voltage EX may be calculated using the above mathematical expression 5) instead of the above mathematical expression 2).

In the "motor resistance updating process" according to the first embodiment, the induced voltage EX is calculated according to the motor voltage equation in step S120; instead, the induced voltage EX may be calculated using a disturbance observer.

In step S210 in the second embodiment, values corresponding to the following A) to C) may be used instead of the average motor resistance Rmavg.

A) The median value among the motor resistance Rm and the stored motor resistances Rmm in multiple computation cycles.

B) The stored motor resistance Rmm (Rmm(n)) in the computation cycle n cycles before.

C) The average value of the stored motor resistances Rmm in multiple computation cycles.

The details of step S310 of the "motor resistance updating process" in the third embodiment may be changed to the following A) or B).

A) Instead of determination as to whether the rate of change in current ID is lower than or equal to the determination rate of change DA, it is determined whether the time rate of change in the motor voltage Vm is higher than or equal to a determination value. Then, when affirmative result is obtained from this determination, the induced voltage EX is calculated. In addition, when negative result is obtained, calculation of the induced voltage EX is suspended.

B) In addition to a determination as to whether the rate of change in current ID is lower than or equal to the determination rate of change DA, a determination as to whether the time rate of change in the motor voltage Vm is higher than or equal to a determination value is made. Then, when affirmative results are obtained from both determinations, the induced voltage EX is calculated. In addition, when negative result is obtained from at least one of the determinations, calculation of the induced voltage EX is suspended (alternative embodiment X).

In the step S310 of the "motor resistance updating process" according to the third embodiment and the above described alternative embodiment X, instead of the rate of change in current ID, the current command value Ia, the output signal SA, the steering torque τ, the target assist force, the motor control signal Sm or a command value of the duty ratio may be used. In addition, instead of the time rate of change in the motor voltage Vm, a command value of the motor voltage may be used.

The details of step S130 of the "motor resistance updating process" according to the first and second embodiments may be modified as follows. That is, in addition to a determination as to whether the induced voltage EX is smaller than or equal to the first determination value GA, a determination as to whether the rate of change in current ID is lower than or equal to the determination rate of change DA is made. Then, when affirmative results are obtained from both determinations, the motor resistance Rm is updated. In addition, when negative result is obtained from at least one of the determinations, updating of the motor resistance Rm is suspended.

The details of step S130 of the "motor resistance updating process" according to the first to third embodiments may be modified into the following A) or B).

A) In addition to a determination as to whether the induced voltage EX is smaller than or equal to the first determination value GA, a determination as to whether the motor current Im is larger than or equal to a determination value is made. Then, when affirmative results are obtained from both determinations, the motor resistance Rm is updated. In addition, when negative result is obtained from at least one of the determinations, updating of the motor resistance Rm is suspended.

B) In addition to a determination as to whether the induced voltage EX is smaller than or equal to the first determination value GA, a determination as to whether the motor voltage Vm is higher than or equal to a determination value is made. Then, when affirmative results are obtained from both determinations, the motor resistance Rm is updated. In addition, when negative result is obtained from at least one of the determinations, updating of the motor resistance Rm is suspended.

The details of step S130 of the "motor resistance updating process" according to the first to third embodiments may be modified as follows. That is, it may be determined whether the induced voltage EX is sufficiently low with respect to the motor voltage Vm, and, when it is determined that the induced voltage EX is sufficiently low, the motor resistance Rm is updated. In addition, a determination as to whether the induced voltage EX is sufficiently low with respect to the motor voltage Vm may be made on the basis of, for example, whether "EX/Vm" is smaller than a determination value or whether "Vm−EX" is larger than a determination value.

When the induced voltage EX of the motor 21 is sufficiently low with respect to the motor voltage Vm, the influence of the induced voltage EX on the estimation accuracy of the motor resistance Rm also decreases. In the above configuration, in view of this point, the motor voltage Vm is set as a determination value for the induced voltage EX. Therefore, the motor resistance Rm may be updated when the influence of the induced voltage EX on the estimation accuracy of the resistance of the motor 21 is small (alternative embodiment Y).

In the above alternative embodiment Y, "motor resistance Rm×motor current Im" may be used instead of the motor voltage Vm. That is, in the above description, the motor voltage Vm may be read as "motor resistance Rm×motor current Im".

When the induced voltage EX of the motor 21 is sufficiently low with respect to "motor current Im×motor resistance Rm", the influence of the induced voltage EX on the estimation accuracy of the resistance of the motor 21 decreases. In the above configuration, in view of this point, the above multiplied value is set as a determination value for the induced voltage EX. Therefore, the motor resistance Rm may be updated when the influence of the induced voltage EX on the estimation accuracy of the resistance of the motor 21 is small.

The first determination value GA used in step S130 of the "motor resistance updating process" according to the first to third embodiments may be set to be larger as the motor current Im or the motor voltage Vm increases.

The second determination value GB used in step S140 of the "motor resistance updating process" according to the first to third embodiments may be set to be larger as the motor current Im or the motor voltage Vm increases.

In step S160 of the "motor resistance updating process" according to the first to third embodiments, a new motor resistance Rm is calculated using the weighted average of the "pre-updated motor resistance Rmold" and the "motor voltage Vm/motor current Im". However, a method of calculating the motor resistance Rm may be modified as follows. That is, the average value of the "pre-updated motor resistance Rmold" and the "motor voltage Vm/motor current Im" may be calculated as a new motor resistance Rm.

Figure 9:
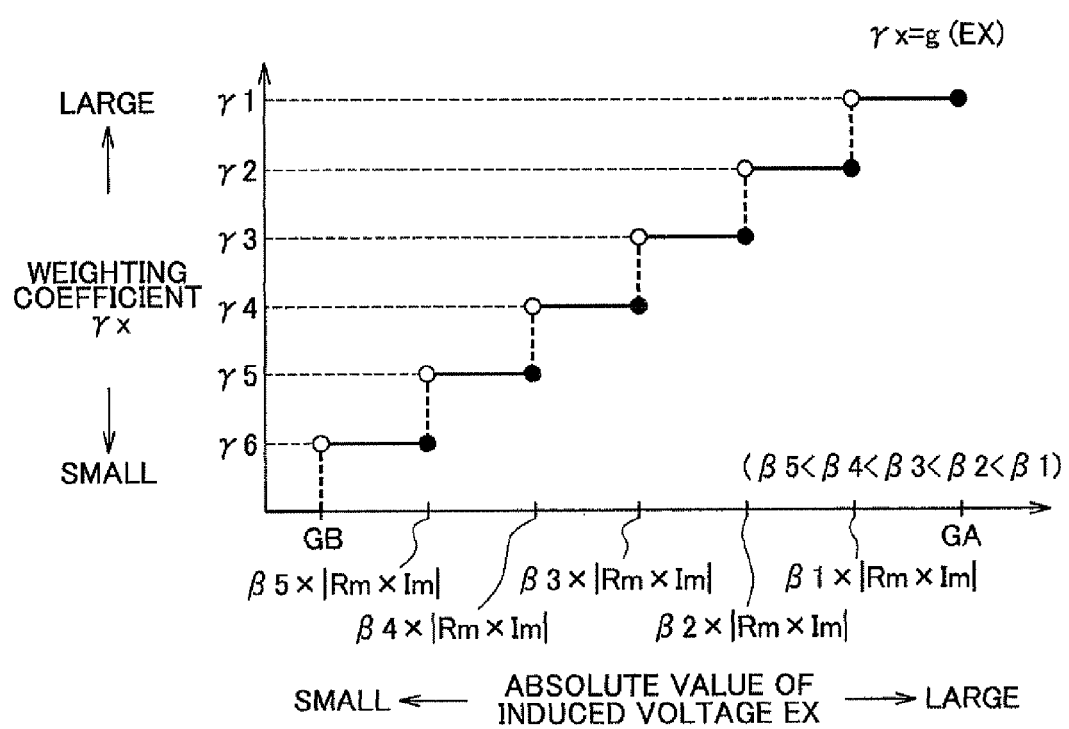
FIG. 9 is a map for calculating a weighting coefficient $\gamma x$ in an alternative example of the "motor resistance updating process" executed by the electronic control unit according to the first embodiment of the invention.

In the "motor resistance updating process" according to the first to third embodiments, the weighting coefficient γx is set on the basis of the ratio between the induced voltage EX and the motor voltage Vm. However, the weighting coefficient γx may be calculated as follows. That is, as shown in FIG. 9, the weighting coefficient γx may be set on the basis of the correlation between the product of the motor resistance Rm and the motor current Im and the induced voltage EX.

In the map shown in FIG. 9, the range of the induced voltage EX is divided into a plurality of ranges by values (hereinafter, "boundary values") that are obtained by multiplying coefficients β by the absolute value of the product of the motor resistance Rm and the motor current Im. In each range between the consecutive boundary values, the same weighting coefficient γx is set for the induced voltage EX. The coefficients β for "Rm×Im" are set such that "β1>β2>β3>β4>β5". The weighting coefficients γx are set such that "1>γ1>γ2>γ3>γ4>γ5".

In the "motor resistance updating process" according to the first to third embodiments, the correlation between the induced voltage EX and the weighting coefficient γx is defined as shown in the map of FIG. 5 such that the weighting coefficient γx increases with respect to the induced voltage EX in a stepwise manner. However, the details of the map may be modified such that the weighting coefficient γx linearly increases with respect to the induced voltage EX.

In the "motor resistance updating process" according to the first to third embodiments, the motor resistance Rm is updated in one of step S150 and step S160 based on the determination in step S130 and step S140. However, updating of the motor resistance Rm may be modified into the following A) or B).

A) Step S140 and step S160 are omitted. That is, when the induced voltage EX is smaller than or equal to the first determination value GA, the motor resistance Rm is updated to the divided value.

B) Step S140 and step S150 are omitted. That is, when the induced voltage EX is smaller than or equal to the first determination value GA, the motor resistance Rm is updated according to the mathematical expression 4).

In the first to third embodiments, the motor resistance Rm is updated in order to accurately estimate the motor speed ωm, and the updated motor resistance Rm may be used in a computing process other than the computing process for estimation of the motor speed ωm.

In the first to third embodiments, a motor with a brush is provided as the motor 21 of the EPS actuator 20. A brushless motor may be provided instead of a motor with a brush.

In the first to third embodiments, the invention is applied to the column-type electric power steering system 1. However, the invention may also be applied to a pinion-type electric power steering system or a rack assist-type electric power steering system. In this case as well, configurations similar to the above embodiments are employed. Thus, advantageous effects similar to the advantageous effects of the above embodiments may be obtained.

What is claimed is:

1. An electric power steering system comprising:
   a motor that applies assist force to a steering system, wherein
   a motor resistance that is a value indicating a resistance of the motor is updated,
   when an induced voltage of the motor is smaller than or equal to a first determination value, the motor resistance is updated, and
   the first determination value is set based on a voltage of the motor or based on a value obtained by multiplying a current of the motor by the motor resistance.

2. An electric power steering system comprising:
   a motor that applies assist force to a steering system, wherein
   a motor resistance that is a value indicating a resistance of the motor is updated,
   when an induced voltage of the motor is smaller than or equal to a first determination value, the motor resistance is updated,
   a value that is smaller than the first determination value is set as a second determination value, and
   when the induced voltage is smaller than or equal to the second determination value, a divided value that is a value obtained by dividing a voltage of the motor by a current of the motor is set as a new motor resistance.

3. The electric power steering system according to claim 1, wherein
   a value that is smaller than the first determination value is set as a second determination value, and
   when the induced voltage is smaller than or equal to the second determination value, a divided value that is a value obtained by dividing a voltage of the motor by a current of the motor is set as a new motor resistance.

4. An electric power steering system comprising:
   a motor that applies assist force to a steering system, wherein
   a motor resistance that is a value indicating a resistance of the motor is updated,
   when an induced voltage of the motor is smaller than or equal to a first determination value, the motor resistance is updated,
   a value that is smaller than the first determination value is set as a second determination value, and
   when the induced voltage is larger than the second determination value and is smaller than or equal to the first determination value, a motor resistance is calculated based on a pre-updated motor resistance that is a currently set motor resistance and a divided value that is a value obtained by dividing a voltage of the motor by a current of the motor, and the calculated motor resistance is set as a new motor resistance.

5. The electric power steering system according to claim 1, wherein
   a value that is smaller than the first determination value is set as a second determination value, and
   when the induced voltage is larger than the second determination value and is smaller than or equal to the first determination value, a motor resistance is calculated based on a pre-updated motor resistance that is a currently set motor resistance and a divided value that is a value obtained by dividing a voltage of the motor by a current of the motor, and the calculated motor resistance is set as a new motor resistance.

6. The electric power steering system according to claim 2, wherein
   a value that is smaller than the first determination value is set as a second determination value, and
   when the induced voltage is larger than the second determination value and is smaller than or equal to the first determination value, a motor resistance is calculated based on a pre-updated motor resistance that is a currently set motor resistance and a divided value that is a value obtained by dividing a voltage of the motor by a current of the motor, and the calculated motor resistance is set as a new motor resistance.

7. The electric power steering system according to claim 3, wherein
   a value that is smaller than the first determination value is set as a second determination value, and
   when the induced voltage is larger than the second determination value and is smaller than or equal to the first determination value, a motor resistance is calculated based on a pre-updated motor resistance that is a currently set motor resistance and a divided value that is a value obtained by dividing a voltage of the motor by a current of the motor, and the calculated motor resistance is set as a new motor resistance.

8. The electric power steering system according to claim 4, wherein
   when the induced voltage is larger than the second determination value and is smaller than or equal to the first determination value, a new motor resistance is calculated using a weighted average of the pre-updated motor resistance and the divided value, and a weight of the divided value is increased with respect to a weight of the pre-updated motor resistance in the weighted average as the induced voltage approaches the second determination value.

9. The electric power steering system according to claim 5, wherein
   when the induced voltage is larger than the second determination value and is smaller than or equal to the first determination value, a new motor resistance is calculated using a weighted average of the pre-updated motor resistance and the divided value, and a weight of the divided value is increased with respect to a weight of the pre-updated motor resistance in the weighted average as the induced voltage approaches the second determination value.

10. The electric power steering system according to claim 6, wherein
when the induced voltage is larger than the second determination value and is smaller than or equal to the first determination value, a new motor resistance is calculated using a weighted average of the pre-updated motor resistance and the divided value, and a weight of the divided value is increased with respect to a weight of the pre-updated motor resistance in the weighted average as the induced voltage approaches the second determination value.

11. The electric power steering system according to claim 7, wherein
when the induced voltage is larger than the second determination value and is smaller than or equal to the first determination value, a new motor resistance is calculated using a weighted average of the pre-updated motor resistance and the divided value, and a weight of the divided value is increased with respect to a weight of the pre-updated motor resistance in the weighted average as the induced voltage approaches the second determination value.

12. An electric power steering system comprising:
a motor that applies assist force to a steering system, wherein
a motor resistance that is a value indicating a resistance of the motor is updated,
when an induced voltage of the motor is smaller than or equal to a first determination value, the motor resistance is updated, and
the induced voltage of the motor is calculated based on a voltage equation of the motor.

13. The electric power steering system according to claim 1, wherein
the induced voltage of the motor is calculated based on a voltage equation of the motor.

14. The electric power steering system according to claim 4, wherein
the induced voltage of the motor is calculated based on a voltage equation of the motor.

15. The electric power steering system according to claim 8, wherein
the induced voltage of the motor is calculated based on a voltage equation of the motor.

16. The electric power steering system according to claim 12, wherein
when at least one of a condition that a time rate of change in current of the motor is lower than or equal to a current determination value and a condition that a time rate of change in voltage of the motor is lower than or equal to a voltage determination value is satisfied, the induced voltage of the motor is calculated based on the voltage equation of the motor.

17. The electric power steering system according to claim 13, wherein
when at least one of a condition that a time rate of change in current of the motor is lower than or equal to a current determination value and a condition that a time rate of change in voltage of the motor is lower than or equal to a voltage determination value is satisfied, the induced voltage of the motor is calculated based on the voltage equation of the motor.

18. The electric power steering system according to claim 12, wherein
the induced voltage is calculated based on a previously calculated motor resistance.

19. The electric power steering system according to claim 16, wherein
the induced voltage is calculated based on a previously calculated motor resistance.

* * * * *